Patented Mar. 17, 1936

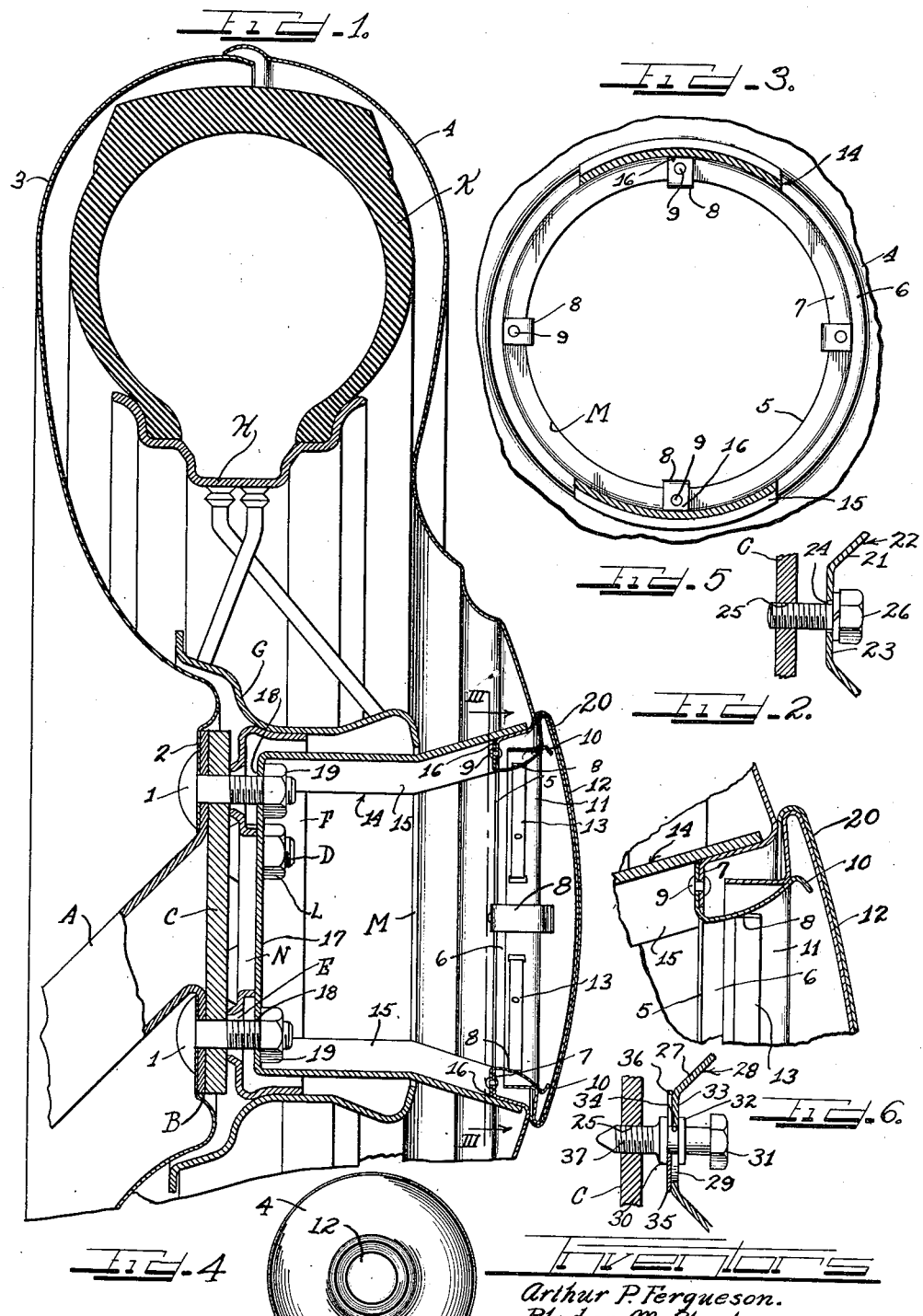

2,034,464

UNITED STATES PATENT OFFICE 2,034,464

TIRE COVER CONSTRUCTION

Arthur P. Fergueson and Bladen M. Short, Detroit, Mich., assignors to Lyon Cover Company, Detroit, Mich., a corporation of Michigan Application February 2, 1934, Serial No. 709,405

5 Claims. (Cl. 150—54)

This invention has to do with covers for spare wheels and tires, and is concerned more particularly with means for mounting the cover in position and for concealing the mounting means.

It is an object of the invention to provide a cover structure embodying means adapted to be positioned in the hollow hub of a spare wheel and to be mounted in position by the means employed to mount the wheel itself on a carrier.

It is another object of the invention to provide a readily applicable and removable closure for the center opening of a front cover member, whereby to conceal the means by which the member is mounted on a spare wheel and carrier.

A further object of the invention resides in the provision of spring means for not only affording a support for the closure for the central opening of a tire cover member, but also to afford a means for preventing rattling between the closure and the cover proper.

It is another object of the invention to provide a closure of this character affording means whereby the same may be attached to the hub of the wheel to function as a hub cap when the cover is removed.

In the practice of the invention, in accordance with one form, the cover may comprise relatively fixed and movable cover members arranged to telescope over the tread of the spare tire, the movable member being preferably at the front. The front member is provided with a central opening and carries a substantially U-shaped strap whose bight is bolted by two or any other number of the general type of bolt means employed in mounting the spare wheel on the carrier. The front cover member at its inner periphery is provided with spring fingers arranged to be snappingly received by the cap for the hub of the wheel. Said cap and central portion of the movable cover member are arranged so that the central opening in the cover member is concealed by the cap, the latter being held by the spring fingers so as not to rattle against the cover member.

The front cover member, strap and spring fingers are preferably united to be movable as a unit, and when removal of the same is desired, it is necessary merely to snap the hub cap off the spring fingers and to loosen the bolt means.

The employment of a stationary cover member is not necessary to the practice of the invention, but is mentioned only for the purpose of illustration.

The construction is therefore very simple, involving merely the stamping or other formation of the cover structure and of the strap and spring members and uniting the same to the cover member which is movable, the cap, if desired, being of any suitable type adapted to be snapped into and out of cooperative relation with the wheel hub, or otherwise cooperate with the wheel hub.

Other important objects and advantages of the invention will appear as the description proceeds.

This invention (in a preferred form) is illustrated in the drawing and hereinafter more fully described.

Figure 1 is a fragmentary sectional view showing a tire cover constructed in accordance with one form of the invention, in cooperative relation to a carrier, a spare wheel and tire and hub cap.

Figure 2 is an enlarged fragmentary view of a portion of the cooperative structure of the tire cover and hub cap.

Figure 3 is a fragmentary sectional view taken substantially in the plane designated by the line III—III in Fig. 1.

Figure 4 is a front elevation of the cover with the hub cap mounted thereon.

Figures 5 and 6 show center bolt fastening means for the cover mounting strap.

Referring now more particularly to the drawing, a spare wheel carrier is shown at A and may be permanently mounted upon any part of an automobile body such as at either side or the rear, and is provided with a flange B to which, for the purpose of reinforcement, an attaching plate C is preferably permanently united as by welding or the like. Attaching bolts D are preferably permanently united to the flange structure B and C with their shanks extending through corresponding openings E in the attaching ring F of the hub G of the spare wheel H on which the spare tire K is mounted. Any number of bolts D may be employed. In accordance with the illustrated embodiment of the invention, two of them serve to support the wheel H by cooperating with nuts L having beveled ends to fit in the countersunk openings E so as to tightly secure the attaching ring F to the carrier A. Only one such bolt and attaching nut L is shown since, preferably, the other or others are arranged substantially diametrically opposite thereto and are therefore not seen in Fig. 1.

Additional bolts preferably permanently united with the carrier A are designated by the reference character 1 and are preferably two in number. These bolts are arranged to fixedly secure the inner peripheral portion 2 of the relatively fixed cover member 3 so that the same is always mounted as shown and constitutes the rear member of the cover structure. As will appear more fully hereinafter, the rear cover member 3 is not essential to the practice of the invention, but is disclosed as illustrative of one form that the invention may take. The cover member 3 is formed to simulate the transverse contour of the spare wheel and tire at the rear sides thereof, although it may have any other shape if such should be preferred. The rear cover member 3 is also formed so that its rim portion extends substantially one-half across the tread of the tire, although it may be made to extend across the tread any desired amount or not at all, in which events preferably the front cover member 4 will be formed to compensate so as preferably to cover substantially the entire tread of the tire.

The front cover member 4 is formed in cross section to simulate the transverse contour of the front side of the spare wheel and tire and is provided with a rim portion arranged preferably to telescope the rim portion of the rear cover member 3 as shown in Figure 1. The rear marginal portion of the front cover member 4 may be formed with a bulge arranged in substantially the median plane of the tire so as to have an ornamental effect. This bead-like portion will also serve as a means for supporting the cover member 4 in a substantially vertical plane so as to protect the remainder of the surface of the cover member 4 from marring by the supporting means such as a floor.

If desired, one of the cover members may be provided with a rubber or like cushion strip arranged to be engaged by the other cover member when the parts are in the relationship shown so as to prevent rattling and prevent entry of moisture or other foreign matter therebetween.

The front cover member 4 is formed with a substantially central opening 5 which is preferably of less diameter than the front opening M in the hub G, and the portion of the cover member 4 adjacent the opening 5 is depressed rearwardly to provide a generally frusto-conical wall 6 and a substantially plane flange 7. A plurality of preferably evenly circumferentially spaced springs 8 are preferably rigidly secured to the flange 7 by rivets 9, spot-welding or in any other suitable way, so as to project forwardly through the opening 5. The free forward ends of the springs are preferably return bent inwardly to provide cam noses 10 arranged on a circle of such diameter that they will be cammed radially inwardly by the generally cylindrical skirt 11 of the hub cap 12 which serves to interlock with the front wall of the hub G by means of its spring prongs 13 when the front cover member is dismounted. The springs 8, rearwardly of their noses 10, flare outwardly to provide additional cam surfaces which, when engaged with the forward margin of the hub cap skirt 11 as shown in Figures 1 and 2, exert an outward and rearward resilient pressure upon the hub cap 12. The hub cap 12 extends radially outwardly of its skirt 11 to such an extent as to be engageable with the front cover member 4 adjacent the depressed portion thereof so as to conceal the central portion of the cover member 4. Thus when the hub cap 12 is engaged with the rear flared cam surfaces of the springs 8 as shown in Figures 1 and 2, the cap is held by said springs in resilient engagement with the cover member 4 adjacent the central depressed portion thereof so as to be substantially coaxial with said cover member and so as not to rattle relative to the cover member.

A substantially U-shaped mounting strap 14 has the free ends of its arms 15 united to the peripheral wall 6 of the cover member depression 5 in any suitable way, as by welding, riveting or the like, and is formed to substantially engage the rear extremities 16 of at least certain ones of the springs 8 to inhibit turning of the same, should for any reason the rivets or other suitable means uniting the springs to the cover member 4 become loose. However, the invention contemplates the securement of the springs with sufficient rigidity to inhibit turning of the springs without assistance.

The strap 14 is formed so that its arms converge rearwardly from their points of connection with the frusto-conical wall 6 in order to pass freely rearwardly through the hub opening M into the hub, the bight 17 of the strap 14 being arranged to abut the inner peripheral flange N of the attaching hub ring F. The bight 17 is provided with openings 18 arranged to be positioned in coaxial alignment with the bolts I so as to receive the forwardly extending shanks thereof and in turn to be engaged by attaching nuts 19 so as to rigidly, though removably mount the cover member 4 on the carrier A.

While the drawing illustrates four springs 8, it will be understood that any suitable number of springs may be employed. Likewise, while there is illustrated a U-shaped member 14, it will be appreciated that a plurality of such members may be used, or, if desired, a spider with any desired number of arms corresponding to the arms 15 may be employed.

It will be observed that the hub cap 12, without any reorganization thereof, the same being of any usual type arranged to be interlocked with the hub of a spare wheel, is adapted by virtue of the spring structure forming the subject matter of the present invention to be readily and removably snapped into interlocked relation to the front drum-like cover member 4, and without necessitating the employment of the means by which the cap is interlocked to the spare wheel hub. The tire cover and associated structure is preferably formed of form-retaining sheet material such as sheet metal, the same being readily stamped by simple manufacturing operations. The invention, as clearly described above, contemplates the employment of a minimum number of parts of simple construction, so that the structure as a whole may be produced at a minimum cost.

The hub cap 12 is illustrated as being provided with a sheath 20. This sheath may be of stainless steel or may be chrome plated for its ornamental effect.

It will be observed from the above description and drawing that when the cap 12 is detached from the cover member 4, the means by which the cover member and the spare wheel are secured to the carrier are rendered accessible.

The cover structure is of such form as to readily fit over tires of different sizes and conditions of wear, and may be mounted in proper position irrespective of the presence or absence of the spare tire.

In Figures 5 and 6, the strap is so formed and attached that none of the wheel attaching bolts are employed.

In Figure 5, the bight 21 of the strap 22 is bent away from the plane of the central portion 23 thereof, said portion and the carrier plate C being provided with coaxially alignable openings 24 and 25, respectively, the latter being tapped to receive the mounting and centering bolt 26.

In Figure 6, the bight 27 of the strap 28 is formed similarly to the bight 21 but has a keyhole 29 to admit the rear shoulder 30 on the bolt 31. This bolt has a front shoulder 32 between which and the shoulder 30 the central part 33 of the bight 27 is swivelly received at the reduced portion 34 of the keyhole 29. A spring washer 35 having a slot 36 is snapped between the rear shoulder 30 and the bight part 33 and holds the bolt in swiveled relation to the strap 28. The tapped central opening 25 in the carrier plate C receives the threaded end 37 of the bolt so that the cover may be detachably held in place.

These two forms of attaching means are particularly effective when employed with a cover which is engageable with the tire, these bolts serving to hold the cover in engagement with the tire since the straps preferably do not abut the wheel hub attaching ring N.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In combination with a spare wheel and tire and a spare wheel carrier and means for securing the wheel to the carrier, the wheel having a hub and a removable cap having means for attaching the cap to the hub: a spare wheel and tire cover, means extending in the hub for removably supporting the cover from the carrier independently of the tire, said cover having an opening to render the second means accessible and to receive the cap, and interengageable means associated with the cover and cap and independent of the aforesaid cap attaching means for removably mounting the cap on the cover.

2. In a spare wheel and cover assembly, a wheel having a rim and an inner wheel fastening part, a support to which said part is adapted to be connected, a side plate structure for disposition over an outer side of the wheel and having a central part fastened in place laterally inwardly of the wheel, transverse fastening means for securing said central part to said support, said structure also having an outer portion defining a central closure cap seat, a closure cap adapted to be seated on said seat to conceal said fastening means, and spring means carried by said central part inwardly of said outer portion for yieldably retaining said cap on said seat.

3. In a spare wheel and cover assembly, a wheel having a rim and an inner wheel fastening part, a support to which said part is adapted to be connected, a side plate structure for disposition over an outer side of the wheel and having a central portion fastened in place laterally inwardly of the wheel, transverse fastening means for securing said portion to said support, said structure also having an outer portion defining a central closure cap seat, a closure cap adapted to be seated on said seat to conceal said fastening means, and spring means carried by said central portion inwardly of said outer portion for yieldably retaining said cap on said seat, said spring means including an angular element having one leg secured to said central portion and having another and free leg disposed to engage yieldably an inner edge of the cap.

4. In a spare wheel and cover assembly, a wheel having a rim and an inner wheel fastening part, a support to which said part is adapted to be connected, a side plate structure for disposition over an outer side of the wheel and having a central portion fastened in place laterally inwardly of the wheel, transverse fastening means for securing said portion to said support, said structure also having an outer portion defining a central closure cap seat, a closure cap adapted to be seated on said seat to conceal said fastening means, and spring means carried by said central portion inwardly of said outer portion for yieldably retaining said cap on said seat, said spring means including an angular element having one leg secured to said central portion and having another and free leg disposed to engage yieldably an inner portion of the cap, said cap being adapted to be snapped in place and having an inner portion adapted to be pressed against said free leg of the spring element and said seat for yieldably retaining the cap against said seat.

5. In a spare wheel and tire cover assembly, a wheel having a rim and an inner wheel fastening part, a support to which said part is adapted to be connected, a tire and wheel cover including a side plate structure for disposition over an outer side of the wheel and having a central part fastened in place laterally inwardly of the wheel, fastening means for securing said part to said support, said structure also having an outer portion defining a central closure cap seat, a closure cap adapted to be seated on said seat to conceal said fastening means, and spring means carried by said central part inwardly of said outer portion for yieldably retaining said cap on said seat, said fastening means including bolt means adapted when tightened in said support to draw said side plate structure toward the outer side wall of the tire.

ARTHUR P. FERGUESON.
BLADEN M. SHORT.